(No Model.)

D. H. STEPHENS.
Endless Belt Filing Machine.

No. 243,645. Patented June 28, 1881.

WITNESSES:

INVENTOR:
D. H. Stephens
BY Munn & Co
ATTORNEYS.

UNITED STATES PATENT OFFICE.

DELOSS H. STEPHENS, OF RIVERTON, CONNECTICUT.

ENDLESS-BELT FILING-MACHINE.

SPECIFICATION forming part of Letters Patent No. 243,645, dated June 28, 1881.

Application filed April 1, 1881. (No model.)

*To all whom it may concern:*

Be it known that I, DELOSS H. STEPHENS, of Riverton, in the county of Litchfield and State of Connecticut, have invented a new and useful Improvement in Endless-Belt Filing-Machines, of which the following is a specification.

My invention relates to an endless-belt file-carrier for the purpose of smoothing articles fed to the files by a carriage actuated by a foot-lever and a connecting-rod.

The invention consists in a novel construction, arrangement, and combination of an endless-band file-carrier, grooved pulleys, and grooved guides, as hereinafter more particularly described.

Figure 1:
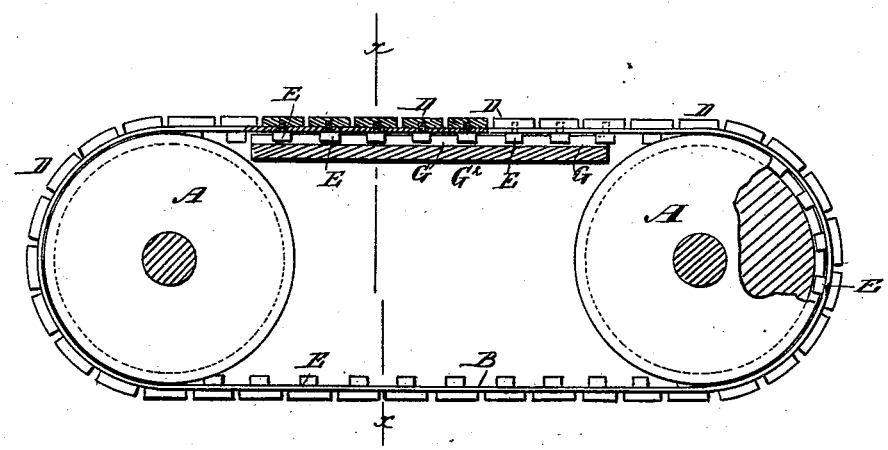
Figure 2:
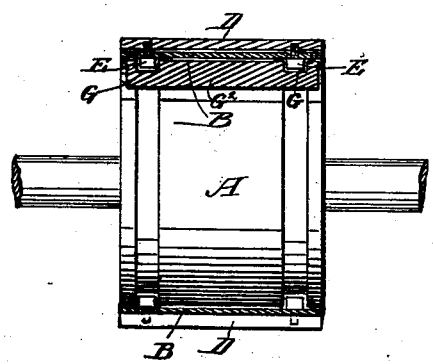

In the accompanying drawings, Figure 1 is a longitudinal vertical section of an apparatus embodying my improvements. Fig. 2 is a transverse vertical section taken in the line $x\ x$ of Fig. 1.

A A represent pulleys, around which passes an endless band or apron, B, which is made of leather or other suitable flexible material. To the apron B the files D are attached by means of bolts E. The pulleys A have their faces grooved sufficiently deep to allow the heads of the bolts E to work freely therein. Between the pulleys are guides having grooves G lying parallel with the line of travel of the apron B and in line with the grooved faces of the pulleys A. These grooves may be formed in a table, $G^2$, or in bars supported by said table, with the tops of the grooves on the same level with the top of the table, and the pulleys may be journaled in any suitable manner in bearings attached to said table.

The work is fed to the files in the usual manner. As the apron B revolves the heads of the bolts E travel in the grooves of the pulleys A and guides G, and are thus prevented from vibrating laterally, and the grooved guides and level top of the table form a firm and solid support for the apron and files, and prevent the files from oscillating when in contact with the work.

Having thus described my invention, I claim as new and desire to secure by Letters Patent—

1. The combination, with a flexible endless band or apron, B, of files D, arranged on the upper side, and bolts E, having their shanks passed up from the under side of belt through the same into the files, the heads of said bolts being thus brought beneath the belt, as shown and described.

2. In a rotary filing-machine, the combination, with an endless apron and with bolt-heads securing the files to the same, of grooved pulleys A and grooved stationary guides or rests G, as herein shown and described.

DELOSS H. STEPHENS.

Witnesses:
HENRY GAY,
HERBERT K. WHITE.